April 23, 1929.　　　J. VODICKA　　　1,710,390
METAL SCREW SOCKET
Filed Aug. 9, 1924
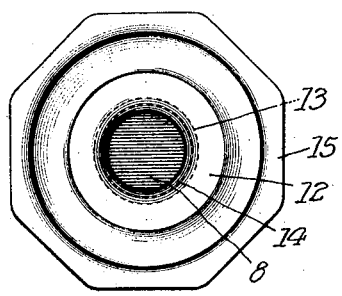
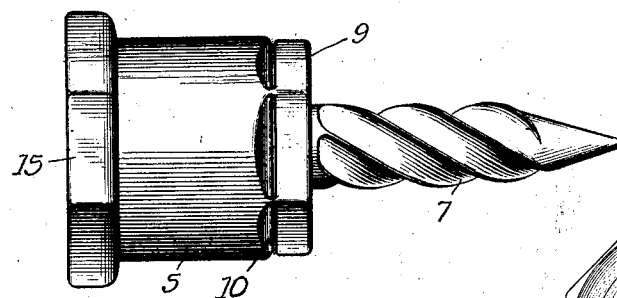
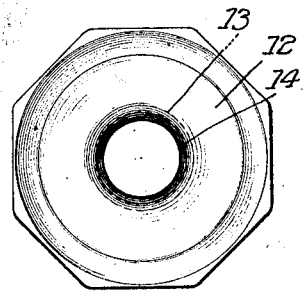
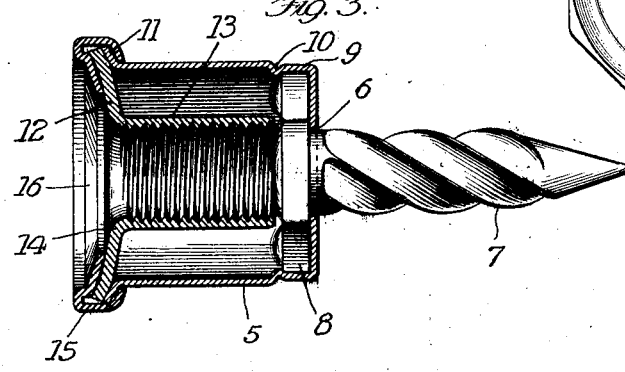

Patented Apr. 23, 1929.

1,710,390

UNITED STATES PATENT OFFICE.

JOHN VODICKA, OF CHICAGO, ILLINOIS, ASSIGNOR, BY MESNE ASSIGNMENTS, TO CINCH MANUFACTURING CORPORATION, OF CHICAGO, ILLINOIS, A CORPORATION OF ILLINOIS.

METAL SCREW SOCKET.

Application filed August 9, 1924. Serial No. 731,285.

My invention is particularly intended and well adapted for service in automobile bodies as, for example, in applying removable or so-called "California" tops thereto, though it will be obvious from what follows that it is also advantageous for a large number of similar uses. It provides a socket for the reception of a metal screw which has a neat and pleasing appearance when applied to a car or other article in which it is used, may be quickly and readily applied, possesses the required strength and is relatively inexpensive to manufacture.

In the drawings accompanying and forming a part of this application, Fig. 1 is a face view of my improved socket; Fig. 2 is a side elevation; Fig. 3 an axial section thereof and Fig. 4 a face view of an element thereof.

The socket comprises a sheet metal housing 5 of generally cylindrical cup shape the bottom of which is perforated at 6 for the reception of the shank of the attaching screw 7 which extends therethrough. The head 8 of the screw is polygonal and rests against the bottom of the housing. The latter is formed near its bottom as at 9 of a polygonal cross-section corresponding to the head of the screw to snugly fit the latter so that relative rotation of the two is prevented. The wall of the housing is crimped or indented immediately over the head of the screw as at 10 to prevent relative axial movement of the screw and housing.

The edge 11 of the cup or housing is bent outwardly as shown, providing a seat for the flange 12 of the threaded sleeve 13. Preferably the flange is slightly concave as shown and the shoulder which it forms with the sleeve rounded as at 14 to render the application of a screw to the sleeve easier. An annulus 15 also struck up from sheet metal and having an inwardly extending dished flange 16 is applied over the outer edges of flanges 11, 12 and bent inward beneath the same to secure them together and form a sightly finish, the peripheries of said flanges and annulus being polygonal and similarly shaped so that they are held against relative movement of any kind. The socket thus constitutes a rigid structure which may be readily applied to an automobile or other structure of wood or the like by sinking a hole of the diameter of the housing and boring another at the center of the bottom thereof for the screw shank 7 and then driving the socket into place by a hammer and wrench, the latter being applied to the annulus 15. Preferably the socket is sunk until the annulus is in contact with the wooden member to which the socket is applied.

I claim:

1. A screw socket comprising a housing, a screw projecting axially from the bottom thereof, and an interiorly threaded sleeve in the housing, said sleeve and socket having outwardly turned flanges and an annulus securing the said flanges together.

2. A screw socket comprising a cup with an outwardly flanged lip and having a hole in the bottom thereof, the lower end of the cup being polygonal, a screw the shank of which extends through said hole in the cup and the head of which fits within the polygonal end of the cup, the wall of the cup being indented over the screw head to hold the latter in place, an outwardly flanged screw sleeve in the housing and a polygonal annulus securing the flanges on the sleeve and cup together.

JOHN VODICKA.